US008406398B2

(12) United States Patent
Gore (10) Patent No.: US 8,406,398 B2
(45) Date of Patent: Mar. 26, 2013

(54) CALL DETAIL RECORD DATA REFINEMENT AND REPORTING

(75) Inventor: Michelle Gore, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 953 days.

(21) Appl. No.: 12/467,028

(22) Filed: May 15, 2009

(65) Prior Publication Data

US 2010/0290610 A1 Nov. 18, 2010

(51) Int. Cl.
*H04M 11/00* (2006.01)
*H04L 12/56* (2006.01)
*G06F 17/30* (2006.01)

(52) U.S. Cl. .......... 379/142.15; 370/312; 370/389; 379/32.01; 379/114.01; 379/121.02; 379/133; 379/201.02; 455/406; 455/408; 705/34; 706/45

(58) Field of Classification Search ............. 370/312, 370/389; 379/114.01, 121.02, 142.15, 32.01, 379/133, 134, 201.02; 455/406, 408; 706/34, 706/45; 705/34
See application file for complete search history.

(56) References Cited

U.S. PATENT DOCUMENTS

| | | | | |
|---|---|---|---|---|
| 5,325,290 A * | 6/1994 | Cauffman et al. | ............... | 705/34 |
| 5,659,601 A * | 8/1997 | Cheslog | ................... | 379/121.02 |
| 6,185,549 B1 * | 2/2001 | Rastogi et al. | ................... | 706/45 |
| 6,249,572 B1 * | 6/2001 | Brockman et al. | ............. | 379/133 |
| 6,359,976 B1 * | 3/2002 | Kalyanpur et al. | ............. | 379/134 |
| 7,050,788 B2 * | 5/2006 | DeLoach et al. | ............... | 455/406 |
| 7,065,192 B2 * | 6/2006 | Danzl et al. | ............. | 379/114.01 |
| 2005/0281263 A1 * | 12/2005 | Miyamoto et al. | ............. | 370/389 |
| 2006/0198504 A1 * | 9/2006 | Shemisa et al. | .......... | 379/201.02 |
| 2007/0140155 A1 * | 6/2007 | Yu | ................... | 370/312 |
| 2008/0119163 A1 * | 5/2008 | Marsh et al. | .................. | 455/408 |
| 2009/0310757 A1 * | 12/2009 | Areddu et al. | ............. | 379/32.01 |
| 2010/0290610 A1 * | 11/2010 | Gore | ........................ | 379/142.15 |

* cited by examiner

*Primary Examiner* — Gerald Gauthier (57) ABSTRACT

An embodiment of a method includes selecting call detail report (CDR) call setup attributes from captured CDR data, refining the CDR data, and summing CDR amount attribute values for each set of CDR call entries having common values for the selected CDR call setup attributes. Each set of one or more CDR call entries having common values for the CDR call setup attributes are combined into a single refined CDR call entry having the common CDR call setup attribute values and the summed CDR amount attribute values. The summing process is repeated for each set of CDR data associated with each of a plurality of network elements. After summing the CDR attribute amount values for call entries having common CDR setup call attribute values for each switch, CDR attribute amount values associated with common CDR setup attribute values in call entries associated with all switches are summed to generate a final set of refined CDR data.

18 Claims, 6 Drawing Sheets

CALL DETAIL RECORD DATA REFINEMENT AND REPORTING

COPYRIGHT NOTICE

Contained herein is material that is subject to copyright protection. The copyright owner has no objection to the facsimile reproduction of the patent disclosure by any person as it appears in the Patent and Trademark Office files or records, but otherwise reserves all rights to the copyright whatsoever. Copyright © 2009 Level 3 Communications, LLC.

BACKGROUND

Today's telecommunication networks are very complex systems that provide communication services for millions of people every day. Telecommunications service providers are constantly monitoring, analyzing, and configuring their networks to ensure that the services provided are consistent with their business goals and supplier and vendor agreements. For example, in a call routing network that sets up calls, network devices such as switches and call routing equipment, are configured to route in accordance with customers' service plans, supplier or vendor agreements, and available network infrastructure (e.g., available trunks). Despite best efforts in configuring network devices to achieve the desired goals, calls are not always routed as desired.

For numerous reasons, a given call may be routed in a manner that is not planned or optimal. For example, a preferred trunk may become inoperable for some reason. In this case, the call will be routed onto another trunk or rejected. The desired trunk may be a lower cost route, or a vendor-preferred trunk, whereas the trunk that is selected may be a higher cost, or not vendor-preferred. Network service providers configure the devices to use the preferred routes, but must also configure devices to choose alternate routes if the preferred route(s) are not available. In order to meet business objectives, network service providers typically want to know how calls are actually routed.

Network service provider personnel, of varying levels, would like to be able to quickly determine how calls are being routed. For example, executives will want to know if the lowest cost routes are being used consistently, and whether routes are being selected according to vendor agreements. Network operations personnel may want to know whether calls are being routed according to the configurations of the devices and whether changes have been made to the network that are causing incorrect routing. Marketing personnel may want to know about call routing volumes and trends to inform marketing decisions. In addition, network service providers may want to know what changes, if any, could be made to meet current or new objectives.

Currently, no systems are available that allow for quick and easy viewing of how calls are being set up through networks. Although switches generate call detail records (CDRs) for every call, and although there are some systems that can gather such CDR data, the gathered CDR data is very difficult to view and quickly understand. Such gathered CDR data is typically recorded on a call-by-call basis and includes large numbers of data items that are often not important to the analysis. Because the amount of CDR data is so large and the presentation is at the individual call level, network administrators are often unable to use the data to determine if, and how closely, network service objectives are being met.

SUMMARY

Embodiments of systems and methods presently disclosed generally relate to refining call detail record (CDR) data related to calls that have been setup by a network. More specifically, embodiments relate to summing selected amounts, such as minutes of use (MOUs) or costs, associated with calls having common call setup characteristics. More specifically still, embodiments relate to selecting call setup characteristics by selecting certain call setup attributes for each call entry in a set of CDR data. The selected amounts are summed for each of one or more call entries having common call setup attribute values. Each of the one or more call entries with common call setup attribute values are reduced to a single entry having the summed selected amounts. As such, in one embodiment, refinement of CDR data involves reducing each set of one or more call entries having common call setup characteristics to a single call entry with selected amounts summed.

An embodiment of a computer-implemented method for analyzing call routing in a network includes capturing call detail record (CDR) data from one or more network elements, storing the captured CDR data in CDR attribute tables, wherein each table includes call entries including CDR attribute values associated with a respective network element, selecting a network element, retrieving selected CDR attribute values from call entries in a CDR attribute table associated with the selected network element, wherein the selected CDR attribute values include one or more call setup attribute values and one or more amount attribute values in the call entries, selecting a combination of one or more call setup attribute values retrieved from one or more call entries, summing each of the one or more amount attribute values from one or more call entries having the selected combination of one or more call setup attribute values, and generating a refined call entry including the selected combination of call setup attribute values and each of the one or more summed amount attribute values.

In an embodiment of the computer-implemented method, the selected CDR call setup attribute values include terminating switch identifier, switch partition code, jurisdiction, terminating area code, terminating local exchange code, state, and terminating vendor identifier. The selected CDR amount attribute values may include minutes of use, call completion count, penalty cost, and total cost. The computer-implemented method may further include selecting a plurality of other network elements, and for each selected network element among the plurality of other network elements: retrieving one or more call setup attribute values and one or more amount attribute values from call entries in a CDR attribute table associated with the selected network element, selecting the combination of one or more call setup attribute values retrieved from one or more call entries, summing each of the one or more amount attribute values from one or more call entries having the selected combination of one or more call setup attribute values, and generating a refined call entry for the selected network element, the refined call entry including the selected combination of call setup attribute values and each of the one or more summed amount attribute values.

In an embodiment of the computer-implemented method, the method may further include, after generating refined call entries for the plurality of other network elements, summing each of the one or more amount attribute values from the generated refined call entries having the combination of one or more call setup attribute values, and generating another refined call entry for all the network elements, the other refined call entry including the selected combination of call setup attribute values and each of the one or more summed amount attribute values.

The computer-implemented method may still further include generating a report including a plurality of refined call entries having summed amount attribute values presented in association with the selected combination of call setup attribute values. In yet another embodiment of the computer-implemented method, selecting the CDR attribute values may include filtering a plurality of CDR attribute values from each call entry.

An embodiment of a computer program product includes computer-readable media storing computer-executable instructions, which, when executed cause a computer to perform a process. An embodiment of the process includes capturing call detail record (CDR) data from one or more network elements, refining the CDR data by performing: a first CDR data reduction process including, for each of the network elements, aggregating selected CDR amount attribute values associated with a selected combination of CDR call setup attributes, wherein the first CDR data reduction process generates a plurality of first refined CDR data entries including a plurality of CDR call setup attribute values and the associated aggregated CDR amount attribute values, and a second CDR data reduction process including summing the selected CDR amount attribute values from the plurality of first refined CDR data entries having the same set of CDR call setup values, wherein the second CDR data reduction process generates a plurality of second refined CDR data entries.

In an embodiment of the computer program product the selected combination of CDR call setup attributes includes terminating switch identifier, switch partition code, jurisdiction, terminating area code, terminating local exchange code, state, and terminating vendor identifier. In an embodiment of the computer the selected CDR amount attribute values includes minutes of use, call completion count, penalty cost, and total cost. The process may further include generating a report including the plurality of second refined CDR data entries.

Further still, the first reduction process may include grouping CDR data entries in the captured CDR data according to combinations of CDR call setup attribute values. Summing of the CDR amount attribute values may include summing corresponding CDR amount attribute values in each group.

An embodiment of a system includes an electronic call detail record (CDR) data capture system configured to receive CDR data from one or more network elements in a network, and an electronic CDR data refinement system configured to: retrieve unrefined CDR data from the electronic CDR data capture system and refine the data by grouping CDR call entries according to selected CDR call setup attributes into groups having common CDR call setup attribute values and summing CDR amount attribute values in each group, for each group, creating a single refined CDR call entry, wherein the CDR call entry includes the CDR call setup attributes common to the group and the summed CDR amount attribute values.

In an embodiment of the system the electronic CDR data refinement system groups unrefined CDR call entries by selecting CDR call setup attribute values that are common among one or more unrefined CDR call entries. The electronic CDR data refinement system may further include a refined CDR data report generator configured to generate a report of refined CDR call entries that include summed CDR amount attribute values for each group of CDR call setup attribute values for all of the one or more network elements. Further still, the electronic CDR data refinement system may include a user interface enabling a user to select the CDR call setup attributes and the CDR amount attributes.

In yet another embodiment of the system, the electronic CDR data capture system is configured to store the received CDR data respective call entries in a plurality of tables, each call entry identifying a call terminated by a NE, and each of the plurality of tables storing call entries corresponding to calls terminated by a specified NE. Further still, the electronic CDR data refinement system may be configured to first group selected call entries within each of a selected one or more of the plurality of tables and sum CDR amount values in each of the first groups to generate a first reduced set of tables, and the electronic CDR data refinement system may be configured to second group selected call entries across all of the first reduced set of tables and sum CDR amount values in each of the second groups to generate a final refined CDR data report.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In communications networks that setup calls between origination and destination endpoints (or between other networks that setup calls), there may be numerous routes that each call could take to reach the destination endpoint (e.g., called number). The route selection is based on route availability at the time the call is placed, as well as preconfigured settings in network devices that setup the call. The network devices, or network elements, are configured in advance to setup calls along certain trunks or to certain vendor networks. The routing configurations of network elements designate a number of routes in order of priority. The order of the routes is set in advance based on business considerations, such as vendor agreements and route costs.

Communications networks are dynamic. New network elements may be added. Old network elements may be removed or replaced. Network element connections may be changed. Available bandwidth on existing connections (e.g., trunks) may become exhausted, thereby resulting in rerouting of calls to other connections, or failed call attempts. These and other network changes can result in numerous different call routing scenarios. How calls are actually routed or setup through a network can be informative of network changes, errors in device configurations, and/or other aspects of network operations.

Furthermore, business conditions are dynamic in relation to call routing (i.e., call setup). Costs of routes may change. Vendor agreements may be put into place, which give preference to a particular vendor, without regard to cost. Changes or trends in jurisdiction (e.g., local or long distance) of calls can impact costs and vendor arrangements. As a result, call routing can impact business decisions, which in turn can impact call routing. Network administrators and business managers therefore have an interest in quickly and easily understanding how calls are being routed through, or terminated by, their network.

Call routing information is available in the form of call detail records (CDRs). CDRs typically include the calling number, the called number, the charged number, the call duration, and other data. There may be tens or hundreds or more network elements in a network that generate CDRs describing each call, or a leg of each call. When all data from all CDRs are combined, the result is a vast amount of data that is not quickly or easily discernable by network administrators or managers.

Embodiments of the present invention relate to systems and methods for capturing and refining large amounts of data, such as CDR data, related to calls that have been routed through, or setup by, a network. CDR data can be captured and refined on a substantially periodic basis, such as monthly or weekly. The refined CDR data can be included in a report that is quickly and easily understood by network administrators and managers. Certain amounts, such as minutes of use, cost, and completed call counts can be summed and shown in association with a combination of one or more selected call setup attributes.

Raw CDR data generated by network elements does not contain minutes of use (MOU) values. Each network element can use a different timing value by which the element stamps a duration value on the CDR. The duration is calculated based upon call setup and call tear down timestamps. In embodiments of the CDR data refinement process, the duration values generated by the NEs are altered to MOUs. The refined CDR data report can show total MOUs for a given set of call setup criteria, so that users can quickly determine from the report how many call minutes of use (MOUs) were terminated, for example, to a particular vendor, to a particular state, or by a particular switch over the prior time period. As another example, users can also quickly determine from the report MOUs that were routed via an unexpected route, for which variable costs were not accounted in configuring network elements.

As discussed further below, calls for which variable costs have been accounted are referred to as "costed" call; calls for which variable costs have not been accounted are referred to as "uncosted" calls. Whether MOUs are costed or uncosted can be useful for network administrators trying to manage variable costs of setting up calls through a network.

In addition to summing MOUs associated with selected call setup attributes, other amounts can be summed for selected call setup attributes. For example, the number of call attempts through selected terminating switches can be summed. As another example, the costs and/or penalty costs associated with calls setup through terminating switches can be summed and reported in association with the terminating switches, jurisdiction, partition, state, and/or terminating vendor identifier (TVID). As such, a refined CDR data report enables the reader to quickly see total costs, penalty costs, MOUs, and call attempts through various combinations of call setup devices, services, locations, and/or parameters.

Figure 1:
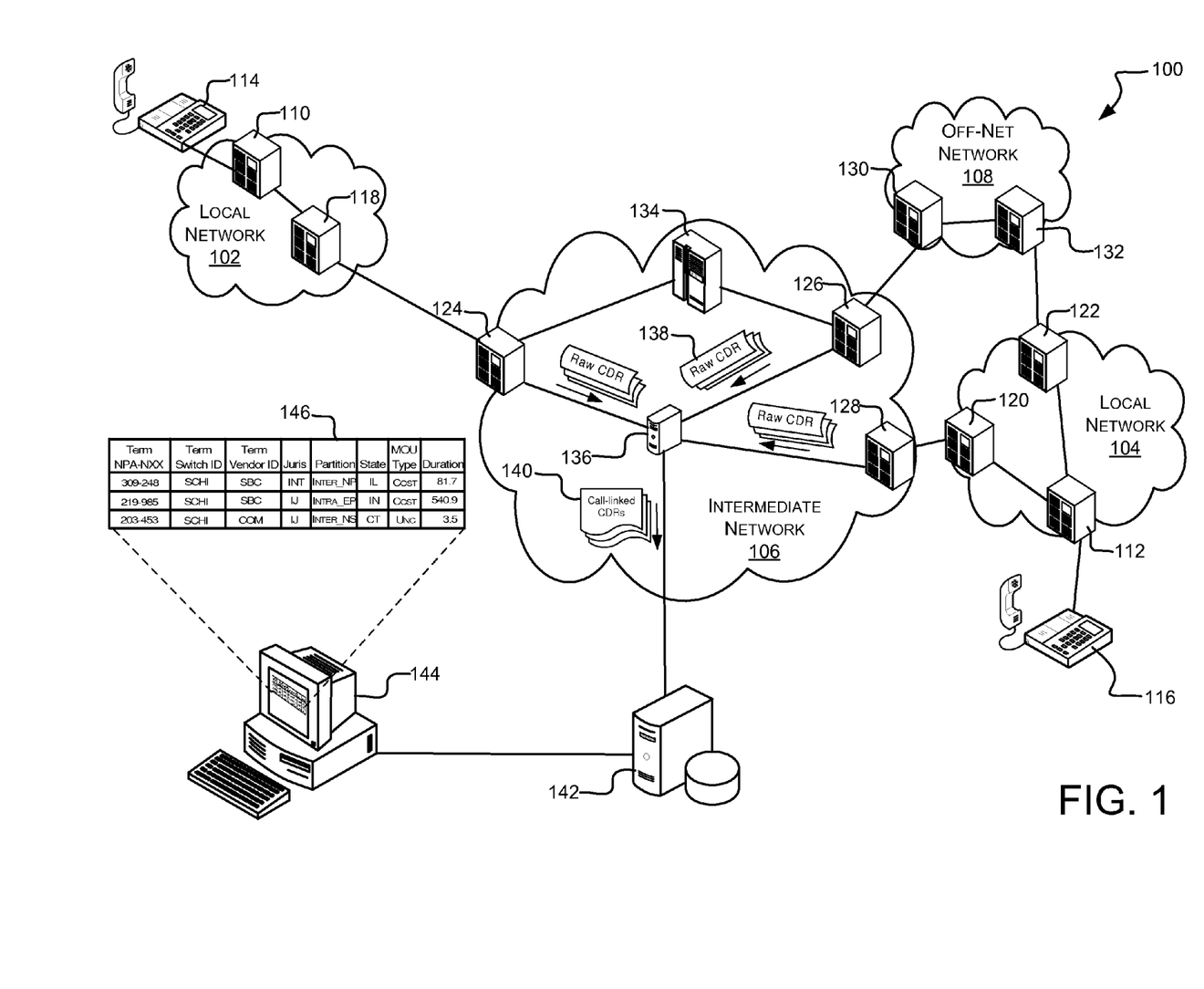
FIG. 1 illustrates an example network environment suitable for setting up calls and gathering call detail record (CDR) data, refining CDR data and reporting refined CDR data related to the calls.

Additional applications of call detail data capturing and refining are described with respect to an example operating environment, such as a network environment 100, shown in FIG. 1. The network environment 100 includes a number of distinct networks, such as a first local network 102, a second local network 104, an intermediate network 106, and an off-net network 108. In general, the intermediate network 106 sets up calls between the first local network 102 and the second local network 104, and may use the off-net network 108 to facilitate call setup.

First local network 102 and second local network 104 serve as call origination and destination networks. For example, first local network 102 and second local network 104 have network elements, such as local exchange 110 and local exchange 112, which are typically located at end offices (not shown) that are proximate to communication endpoints, such as telephone 114 and telephone 116. Although the communication endpoints 114 and 116 are illustrated as desktop telephones, it will be appreciated that communication endpoints 114 and 116 may be any communication device configured to connect to local networks 102 and 104, respectively. By way of example, but not limitation, communication devices may include cell phones, voice over IP phones, soft phones (i.e., computer-based phones), or others.

Local networks 102 and 104 also include other network elements, such as switch 118 and switch 120, respectively, for routing calls to, and receiving calls from, the intermediate network 106. Switch 118 and switch 120 may be, for example, Class 4 or tandem switches, which are typically configured for interconnection with other networks. In addition, a local network, such as local network 104 may include other switches, such as switch 122, which can route calls to, and receive calls from, the off-net network 108.

Often, calls being setup by the intermediate network 106 are setup indirectly to local network 104 via the off-net network 108. Off-net network 108 may be owned and managed by a vendor of call routing services. The vendor may have agreements with the owner of the intermediate network 106, whereby calls are routed to the off-net network 108. Like other call setups through the intermediate network 106, such off-net routing of calls is recorded in CDRs as discussed further below.

As mentioned earlier, the intermediate network 106 sets up calls through the network 106 between the local networks 102, 104, and/or off-net network 108. To perform call setup, the intermediate network 106 includes network elements, such as switch 124, switch 126, and switch 128. Switch 124, 126 and 128 may be Class 5 or softswitches, as are known in the art. As such, switch 124, 126, and 128 handle call control and signaling associated with setting up calls. Switch 124, 126, and/or 128 can typically allow for, or provide, one or more other functions related to call setup, including protocol conversion (e.g., between packet switched and circuit switched), centralized control of multiple switching platforms, Quality of Service (Qos) and Grade of Service (GoS).

The intermediate network 106 typically spans a geographic area larger than the geographic area spanned by the local networks 102 and 104. In this regard, the intermediate network 106 includes a geographically distributed infrastructure of network elements and channels (e.g., fiber optic cables, copper wire and/or others) for carrying call signaling data over potentially large distances. As such, the intermediate network 106 is operable to set up calls between multiple local regions or metropolitan areas. Local network 102 and local network 104 may, for example, be situated in or around distinct metropolitan areas, where local network 102 and local network 104 can handle local call origination and termination (i.e., setup).

To further illustrate, the first local network 102 may be situated in the Atlanta metropolitan area and the second local network 104 may be situated in the Boston metropolitan area. In this case, the intermediate network 106 could facilitate setting up calls between Atlanta and Boston, and vice versa, by routing calls from the first local network 102 (or the second local network 104) to the second local network 104 (or the first local network 102). For example, a call setup request received at switch 124 from switch 118 may be sent to switch 128. From switch 128, the call setup request can be sent to switch 120, which can send the call setup request to end office switch 112, which can terminate the call. During actual operation, intermediate network 106 would span, and facilitate call setup among, many more local metropolitan areas than are shown in FIG. 1.

Continuing with the prior example call setup, a call setup request received by switch 124 from switch 118 may be sent to switch 126. From switch 126, the call setup request can be sent to another network element, such as switch 130 of the off-net network 108. The switch 130 can send the call setup request to another switch 132 in the off-net network 108, which can terminate the call from the off-net network 108 to switch 122 of the local network 104. The call setup request can then be sent to switch 112, which can terminate the call to the endpoint 116.

Terminating a call refers to setting up a final leg (the egress leg) of a call before the call leaves a network. The switch device that handles the termination of the call from the network is referred to as the terminating switch. In this regard, for example, when switch 128 sets up call to switch 120, switch 128 is considered the terminating switch associated with setting up the call by the intermediate network 106. As such, in general when a call egresses the intermediate network 106 from switch 124, 126, or 128 to another network, the switch 124, 126, or 128 from which the call egresses the network 106 is considered the terminating switch associated with that call, with respect to the intermediate network 106.

For ease of illustration, FIG. 1 only shows a few network elements in each network. In actual operation, there are typically many more network elements and potentially numerous channels between the various networks. When the intermediate network 106 is setting up call, a channel (e.g., a trunk) and a terminating switch are selected for setting up the call to another network. The selection of the terminating switch and channel are made based on route settings configured on the network elements.

In one embodiment, network elements in the intermediate network 106 are configured using a core routing engine (CRE) 134. The CRE 134 is a network element with memory and processing capability to manage routing among network elements within the network 106. The CRE 134 is set up with one or more route plans that associate terminating area code/local exchange codes (designated by NPA-NXX, which are the first six digits of a ten digit telephone number) with route labels that identify one or more routes that can be used for setting up calls to the terminating NPA-NXX.

The route plans in the CRE 134 can be organized according to partitions. A partition can be associated with a service level or customer service plan or jurisdiction used in routing calls. Partitions, route plans, and configuration of the CRE 134 is discussed in detail in copending US Patent Publication No. 2009/0074173 and US Patent Publication No. 2009/0080630 both entitled "LOCAL ROUTING MANAGEMENT IN A TELECOMMUNICATIONS NETWORK", which have common assignee and which are both incorporated herein by reference for all purposes.

According to one embodiment, configuration data (e.g., route plans) from the CRE 134 is propagated to network elements (e.g., switch 124, switch 126, and switch 128) of the intermediate network 106. The network elements then set up calls according to the configuration data. When a network element sets up a leg of a call, the network element generates a call detail record (CDR) that records a number of details about the call leg, such as the origination number, destination number, destination switch, and others. CDRs are constantly being created as call legs are set up.

In one embodiment, CDRs generated by the network elements are sent to a CDR collector 136. The CDRs sent to the CDR collector 136 include CDR data that is referred to as raw CDR data 138. The raw CDRs 138 from different network elements may be associated with different legs of the same call. The CDR collector 136 links CDRs related to different legs of the same call into a CDR related to the entire call. In this manner, CDRs related to the same calls are combined into call-linked CDRs 140. The CDR collector 136 may be a server computer or other computing device configured to link CDR data that is related by call.

Call-linked CDRs 140 are sent to a CDR capture point, such as CDR capture server computer 142. CDR capture server computer 142 gathers CDR data from the call-linked CDRs 140 and organizes CDR data in tables, for example in a database. As is discussed further below with reference to FIG. 3, the CDR data tables are composed of many rows of CDR data, with each row including CDR attributes for a given call. Each call is assigned a call identifier (ID) associated with each call entry in the tables.

In one embodiment, the CDR capture server 142 captures CDR data 140 on a specified day each month. Over a month time period, hundreds of thousands or millions of calls may have been set up by network elements of the intermediate network 106. The CDR data at the CDR capture server 142 is unrefined, meaning that the data is not organized or formatted in a way that allows for quick and easy understanding of aggregated results of call routing through the network. In part because CDR data is listed on an individual call basis at the CDR capture server 142, a user would typically find it very difficult to discern the impact of how calls were routed over the month on a larger scale. For example, a user would have difficulty interpreting the impact of a penalty cost associated with the setup of a single call via a non-preferred trunk.

Furthermore, the CDR data tables of the CDR capture server 142 are additionally difficult to read and understand for impact analysis because each call entry includes many (e.g., tens or hundreds) CDR attributes that are not necessarily important to a given analysis. As is discussed further below, the inclusion of many CDR attributes in the CDR data tables by the CDR capture server 142 can make quick and/or effective analysis of the data difficult if not impossible. Embodiments described below provide for refinement of the CDR data and generation of reports of the refined CDR data.

In one embodiment, a CDR data refinement and reporting computer 144 retrieves selected CDR attribute values from the CDR data capture server 142. The CDR data refinement and reporting computer 144 is configured to sum selected amount attribute values associated with selected call setup attribute values. Amount attribute values are measurable values associated with calls. The selected amount attribute values may be minutes of use, completed call count, attempted call count, penalty costs, total costs, or others. One or more of the amounts are summed for a given set of one or more call setup attribute values, which indicate characteristics of the manner (e.g., where, by what terminating switch, to what vendor, what jurisdiction, etc.) or location in which calls were setup by network elements within the intermediate network 106.

For example, the amounts can be summed for each combination of one or more of terminating NPA-NXX, terminating switch, terminating vendor, jurisdiction, partition, and/or state. A report 146 of the refined CDR data can be generated for presentation on the computer 144 monitor, delivery (e.g., via email) to network personnel, or printing on a printer. Example embodiments of the CDR data refinement process and report generation are discussed further hereinbelow with reference to FIGS. 2-6.

The lines connecting various devices (e.g., network elements or servers) in FIG. 1 are intended only to indicate that there is some form of communication link between the devices to assist in illustration, and do not imply any particular type of communication technology. The lack of a line between any two devices does not mean there is not a communication link between the devices. Indeed, there may be communication between numerous devices that are not connected with a line in FIG. 1. For example, in one embodiment, the CDR capture server 142 communicates with the CRE 134 to configure route plans associated with an optimal cost routing matrix (OCRM), which can be generated by the CDR capture server 142.

Figure 2:
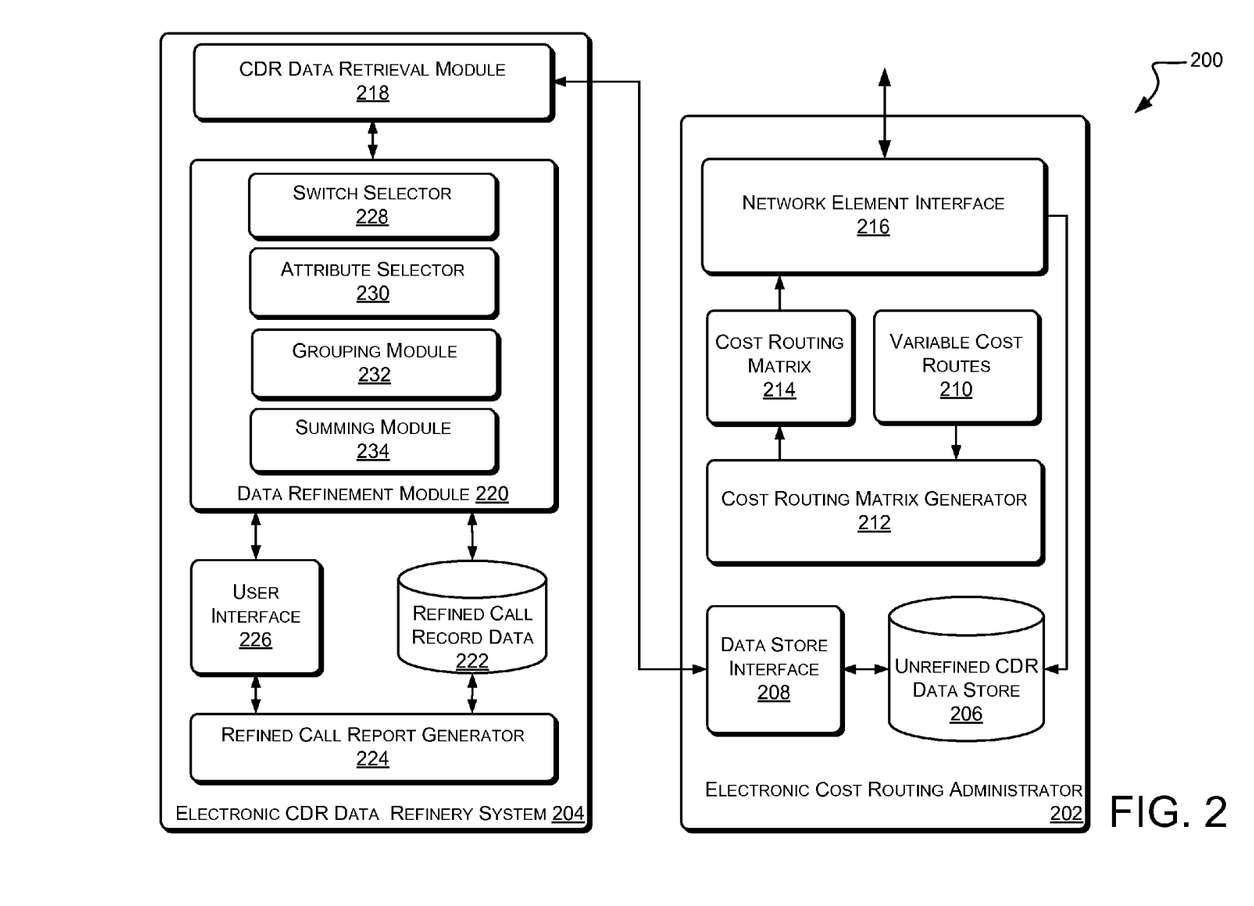
FIG. 2 is a functional module diagram illustrating a system for gathering CDR data, refining CDR data and reporting refined CDR data according to an embodiment.

FIG. 2 illustrates a system 200 configured to capture unrefined call detail record (CDR) data and refine the CDR data according to one embodiment. The system 200 includes an electronic cost routing administrator 202 and an electronic CDR data refinery system 204. In addition to performing various cost routing functions (discussed further below), the cost routing administrator 202 serves as a CDR capture point by receiving call-linked CDR data (e.g., CDR data 140 (FIG. 1)) from one or more CDR data generators, such as switches (e.g., switch 124, 126, or 128 (FIG. 1)) and/or intermediate collection points (e.g., CDR collector 136 (FIG. 1)) within a network (e.g., network 106 (FIG. 1)). The cost routing administrator 202 may correspond to the CDR data capture server 142 of FIG. 1, but this is not necessarily the case in some embodiments.

In the illustrated embodiment, the cost routing administrator 202 includes an unrefined CDR data store 206, a data store interface 208, variable cost routes 210, a cost routing matrix generator 212, an optimal cost routing matrix 214 and a network element interface 216. As mentioned, the cost routing administrator 202 performs cost routing functions including generating an optimal cost routing matrix 214 and interfacing with one or more network elements, via the network element interface 216, to configure the optimal cost routing matrix in routing plans, for example on the CRE 134 (FIG. 1).

In this regard, the cost routing matrix generator 212 reads variable cost routes 210 and determines preferred routes for called numbers or NPA-NXX's (i.e., area code/local exchange code pairs). The variable cost routes 210 include data about routes for calls to egress the network, along with associated variable costs. The variable cost routes 210 are typically based on numerous factors such as vendor rate or cost sheets, tariffs, exclusions, domain constraints, and others. Other data (not shown), such as business rules and trunk group constraints, may be used in addition to variable cost routes 210 to generate the optimal cost routing matrix 214. The optimal cost routing matrix 214 that is generated by the cost routing matrix generator 212 is a mapping of all NPA-NXX's to preferred routes on the basis of variable costs.

The network element interface 216 communicates data from the optimal cost routing matrix 214 to one or more network elements, such as the CRE 134, to thereby configure the network elements to setup calls according to the matrix 214. The network element interface 216 also captures call-linked CDR data from one or more network elements. The capturing of CDR data from network elements may occur substantially periodically. The captured CDR data is stored in the unrefined CDR data store 206.

In one embodiment, the CDR data received by the network element (NE) interface 216 is stored in tables in the unrefined CDR data store 206. As such, the unrefined CDR data is not in raw form, but it is organized in some fashion. After the CDR data is stored, the data store interface 208 can retrieve data from the data store 206 in response to requests for data. For example, as further discussed below, unrefined CDR data may be requested by a CDR data retrieval module 218 of the electronic CDR data refinery system 204. For example, the data store interface 208 may respond to structured query language (SQL) commands, or other commands, to retrieve data from the unrefined call detail data store 206.

CDR data received by the NE interface 216 is categorized into period of time, and according to terminating network switch. Certain CDR parameters (e.g., fields or attributes) are inserted into particular tables in unrefined CDR data store 206 according to their applications—e.g., by switch, by month, and by "costed" or "uncosted". A subset of CDR attributes and example tabular arrangements of CDR attributes are discussed further below.

Figure 3:
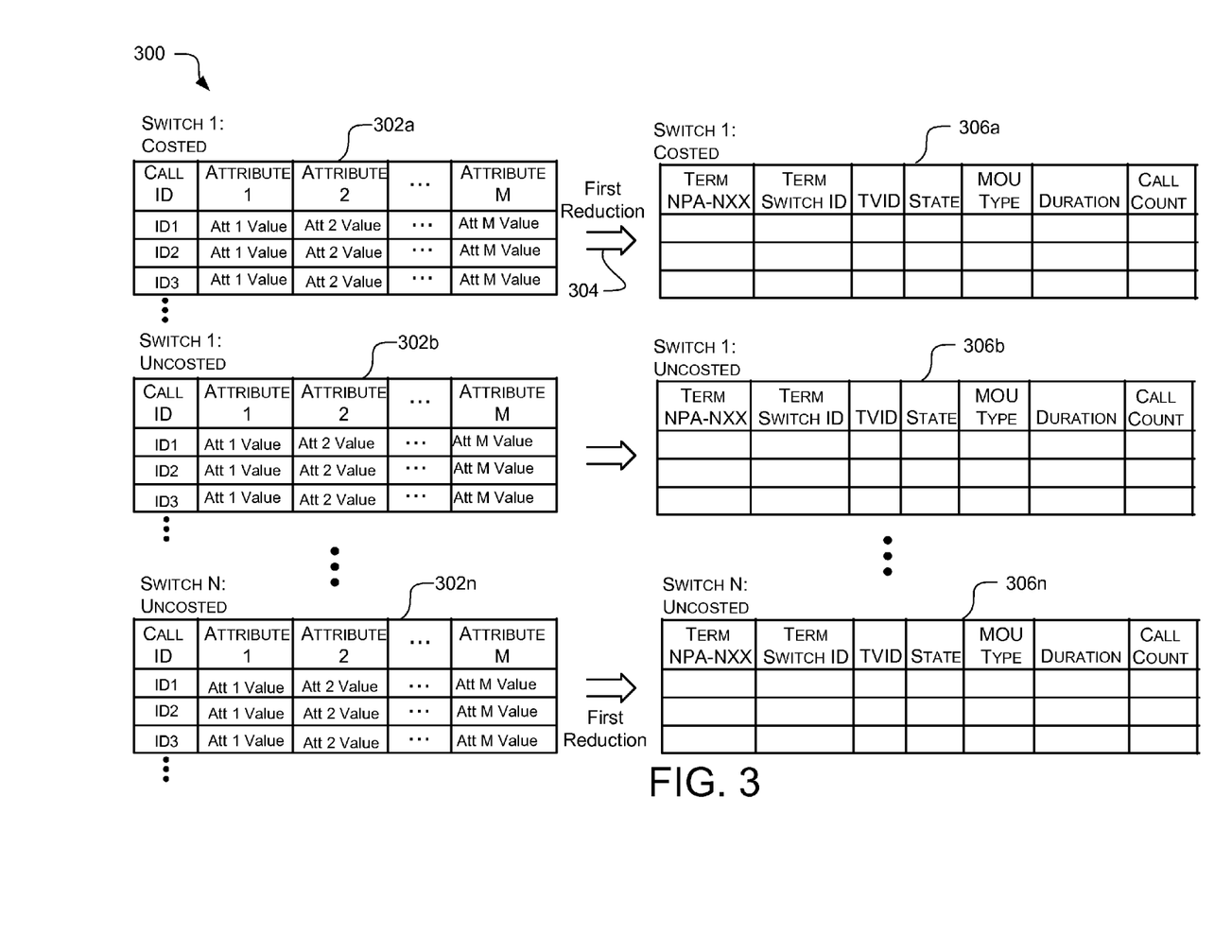
FIG. 3 illustrates example call entry tables including CDR data, and a first reduction of call entry data in a process of refining CDR data according to an embodiment.

Although data in the unrefined CDR data store 206 is typically organized in some fashion (e.g., tabular, by switch), the unrefined CDR data is not readily understandable or usable by network operations personnel or management because of the large amount of data and the format of the data. To illustrate, example unrefined CDR data is shown in FIG. 3 as a set of call entry tables 302. Each row, or call entry, of each unrefined table 302 corresponds to an individual call that was terminated by a network element (NE) of the network during a prior time period (e.g., last month). In one embodiment, each table 302 includes call data for calls terminated (i.e., routed out of the network) by one of the switches in the network.

For example, table 302a lists calls terminated by a switch identified as "Switch 1". In actual operation, the terminating switches may be identified by their geographical or metropolitan location, such as Boston, Dallas, Chicago, Denver, Seattle, and so on. Within the unrefined CDR data store 206, each table 302 is identified by a switch identifier, such as BOS (Boston), CHI (Chicago), DEN (Denver), SEA (Seattle), and so on. As such, each table 302 corresponds to a single terminating switch within the network. In one embodiment, there are between sixty and seventy switches for which CDR data is captured in the data store 206.

Furthermore, in one embodiment there are multiple tables 302 for each switch in the network. The tables for each switch are designated by a subtype. For example, there may be two subtypes: "costed" and "uncosted". In the illustrated embodiment, there is a "costed" table 302a for "Switch 1" and an "uncosted" table 302b for "Switch 1". Call entries in a "costed" table relate to calls for which variable costs have been accounted. Call entries in an "uncosted" table relate to calls for which variable costs have not been accounted. An "uncosted" call entry may be created in the unrefined CDR data store 206 if, for example, the associated call exited the network through an unexpected channel. This may occur, for example, if preferred network trunks were overly congested and could not take the call, so the call had to be routed through another, unexpected trunk. Therefore, uncosted call entries represent calls for which variable costs have not been accounted.

Although only two subtypes (e.g., costed and uncosted) are illustrated in FIG. 3, it will be understood that there could be other subtypes of tables, depending on the particular implementation.

Each entry (i.e., terminated call) in each unrefined table 302 includes a large number of attributes associated with a call identifier (ID). Although only a few rows and columns are shown in each unrefined table 302, in actual operation, over just a few weeks of calls, each unrefined table 302 will typically have hundreds of thousands of call entries. In addition many (e.g., tens or hundreds) attributes are stored in relation to each call ID. Not all the attributes are shown in FIG. 3, due to space limitations. As just an example of some of the attributes that are stored in tables 302 of the aggregated call detail data store, for each call, there is stored the originating area code (NPA), originating local exchange code (NXX), destination area code (NPA), destination local exchange code (NXX), origination switch ID, terminating switch ID, terminating vendor ID, destination state, terminating end office, tandem, local access and transport area (LATA), call duration, jurisdiction, partition, call attempts, billable duration, total cost, and other representations of cost or duration.

The amount of data in the tables 302 of the unrefined CDR data store 206 is extremely large. The unwieldy nature of the unrefined CDR data is due in part to the fact that a separate call entry is stored for each call, and the large number of attributes that are stored for each call. It is very difficult for a network administrator or manager to glean any real useful information from the tables 302. For example, it is not very helpful for the network administrator to know that a particular call was terminated by a switch in Boston and lasted ten minutes. However, it may be helpful for a network administrator to know that the total duration of all calls terminated by the Boston switch during the past month was 357.8, for example. The accumulated duration of all calls may provide a better understanding of how the switch is being used.

Therefore, the electronic CDR data refinement system 204 provides functionality for refining the unrefined CDR data in data store 206. As mentioned earlier, a CDR data retrieval module 218 interfaces with the data store interface 208 to retrieve unrefined CDR data. The electronic CDR data refinement system 204 also includes a data refinement module 220 (discussed in more detail below), a set of refined CDR data 222, a refined CDR data report generator 224, and a user interface 226.

In the illustrated embodiment, the data refinement module 220 includes a switch selector 228, an attribute selector 230, a grouping module 232 and a summing module 234. The switch selector 228 selects the switch table 302 from which to retrieve unrefined CDR data from data store 206. The attribute selector 230 selects particular attribute values from each call entry in the selected switch table 302. In one embodiment, the attribute selector 230 can be configured by a user via the user interface 226 to select user-specified attribute values. In selecting particular attribute values from the call entries, the attribute selector 230 performs a filtering process, where unwanted attribute values are not retrieved.

In various embodiments, the attribute selector 230 selects two types of attribute values: call setup attribute values and amount attribute values. Call setup attribute values pertain to the manner and/or location in which calls were setup in the network, including, for example, the terminating switch, the terminating NPA-NXX, the jurisdiction, the type of minutes of use (MOUs) (e.g., costed or uncosted), the partition, or the state of call termination. Amount attribute values are values that relate to the duration, cost, call counts, or other values that can be summed.

In an embodiment, the grouping module 232 groups call entries that have common values for the call setup attribute values. Because there are typically numerous combinations of the call setup attribute values, the grouping module 232 typically creates numerous corresponding groups of one or more call entries that have the common call setup values. The summing module 234 sums selected amount attribute values within each group of call entries created by the grouping module. The summing module 234 also combines or reduces each group of one or more call entries having common call setup attribute values into a single reduced call entry including the selected call setup attribute values and the summed set(s) of amount attribute values.

In the illustrated embodiment, the refined CDR data produced by the data refinement module 220 is stored in the refined call record data store 222. The report generator 224 can retrieve refined CDR data from the refined call record data store 222 and generate various reports. The reports that are generated may be formatted in numerous different ways and/or include various subsets of refined CDR data. Via the user interface 226, a user can input settings specifying the format and/or data within generated reports. Generated reports may be stored in memory, sent to selected network management personnel, printed on a printer, or used/output in other ways.

With further regard to FIG. 3, there is illustrated in FIG. 3 an example first reduction of call entry data in a process of refining CDR data. As discussed above, when CDR data is initially captured, the unrefined CDR data is stored in tables 302. Each table includes call entries associated with a network element that terminated the calls identified in the call entries. Each call entry has multiple attribute values associated with attributes that are collected in CDRs. FIG. 3 illustrates a process of first reducing 304 each table 302 to another refined CDR data table 306 having a set of first reduced call entries.

According to one embodiment, in the first reduction 304, call entries in each table are grouped according to values for a set of CDR call setup attributes. The set of CDR call setup attributes can be selected, and may include one or more of terminating NPA-NXX, state, terminating switch ID, type of minutes of use (e.g., costed or uncosted), jurisdiction, or partition. There may be one or more call entries for each group. For each group, selected CDR amount attribute values are summed. For example, within each group of call entries, one or more of the minutes of use (MOUs), total costs, penalty costs, and call completion counts are summed. The particular values that are summed may be selected.

According to an embodiment, different refined CDR data reports can be generated for different call setup criteria and different summed values. For example, one report may include CDR call setup attributes of terminating switch and terminating NPA-NXX, and may include only the sum of MOUs for those selected call setup criteria. Another report may include call setup attributes of terminating switch, terminating NPA-NXX, partition, terminating vendor ID (TVID), and MOU type, and may include the sums of MOUs and penalty costs. A user may specify the attribute selections via the user interface 226 of FIG. 2.

The first reduction process 304 involves reducing each of the groups of one or more call entries having common values for the selected CDR call setup criteria into a single call entry in the refined tables 306. In each refined call entry of each refined table 306, the common CDR call setup values are included along with the summed CDR amount attribute values for the group. In the example illustrated in FIG. 3, the CDR call setup attribute values by which the call entries were grouped are terminating NPA-NXX, terminating switch ID, TVID, jurisdiction, state and MOU type, and the CDR amount attribute values that were summed for each group are call duration (i.e., MOU) and call count.

Figure 4:
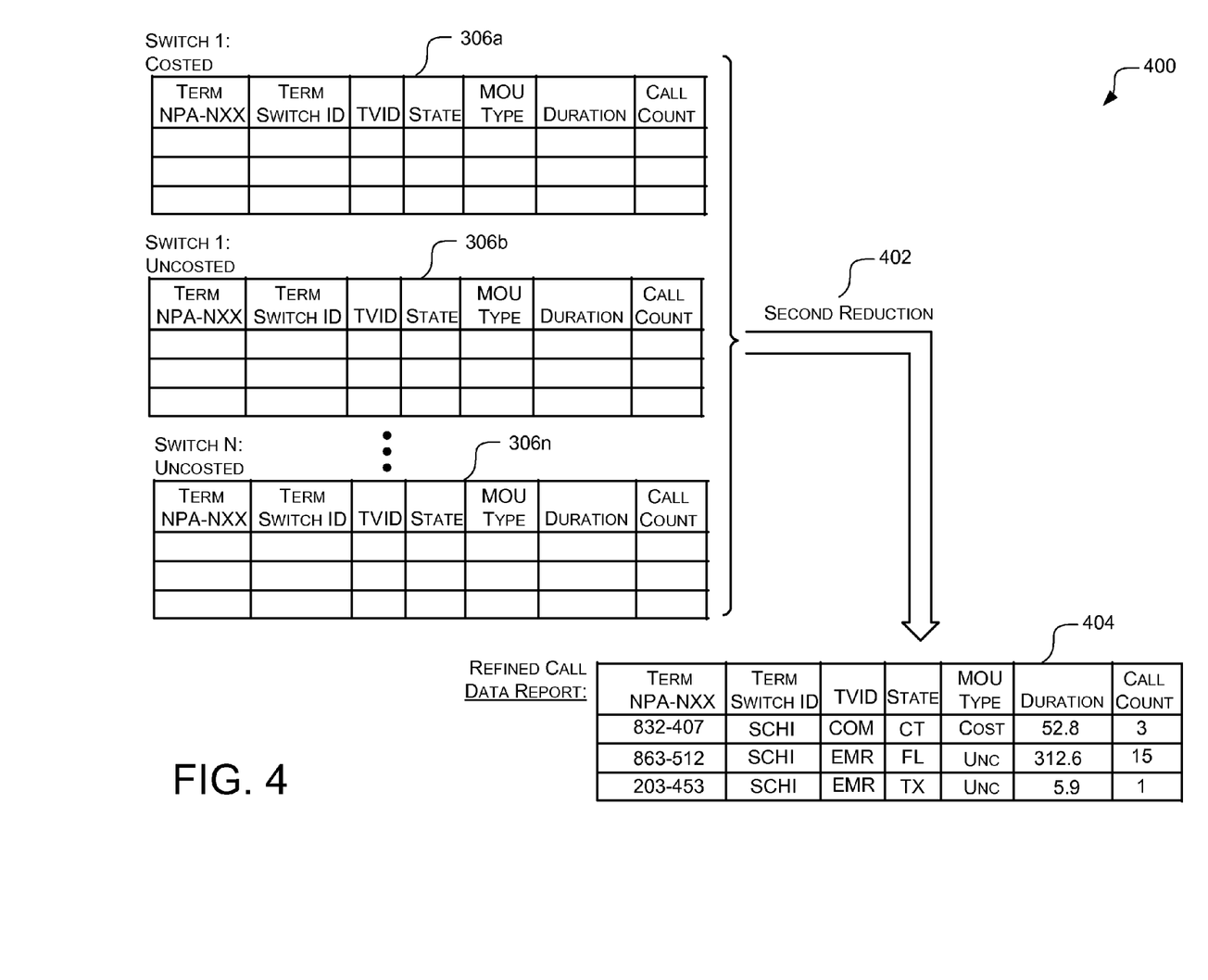
FIG. 4 illustrates a second reduction in the process of refining CDR data according to an embodiment.

FIG. 4 illustrates a second reduction scheme 400 in the process of refining CDR data according to an embodiment. The first reduced call entry tables 306 are further reduced in the second call reduction 402. In the second call reduction, the call entries of the first reduced call entry tables 306 are again grouped according to common call setup criteria, but this time, they are grouped across all the switch tables. After grouping, the selected CDR amount attribute values are summed. After summing the selected sets of CDR amount attribute values, each group of the reduced call entries is reduced again to a single entry including the common set of CDR call setup attribute values and the summed CDR amount attribute values for the group.

An example final set of refined CDR data after the first and second reductions is shown in refined call data report 404. The refined call data report 404, or a subset of data in the report 404, can be used in a refined CDR data report. As a result of the first reduction process 304 and the second reduction process 402, the CDR data has been refined down to fewer call entries, with selected CDR amount attribute values (e.g., MOUs, call completion count, etc.) aggregated.

In some embodiments, only a subset of the call setup attributes are included in the refined call data report 404, and the amount attribute values are summed for the subset. A subset of one or more of the call setup attributes from the first reduced call entry tables 306 may be selected. Then, all amount attributes for the selected call setup attributes are summed and included in the refined call data report 404. For example, whereas first reduced call entry table 306 may include terminating NPA-NXX, terminating switch ID, terminating vendor ID (TVID), state and MOU type, refined call data report 404 may present only terminating NPA-NXX and TVID. In this case, duration and call count for common terminating NPA-NXX's and TVIDs would be summed, regardless of the other call setup attributes.

Figure 5:
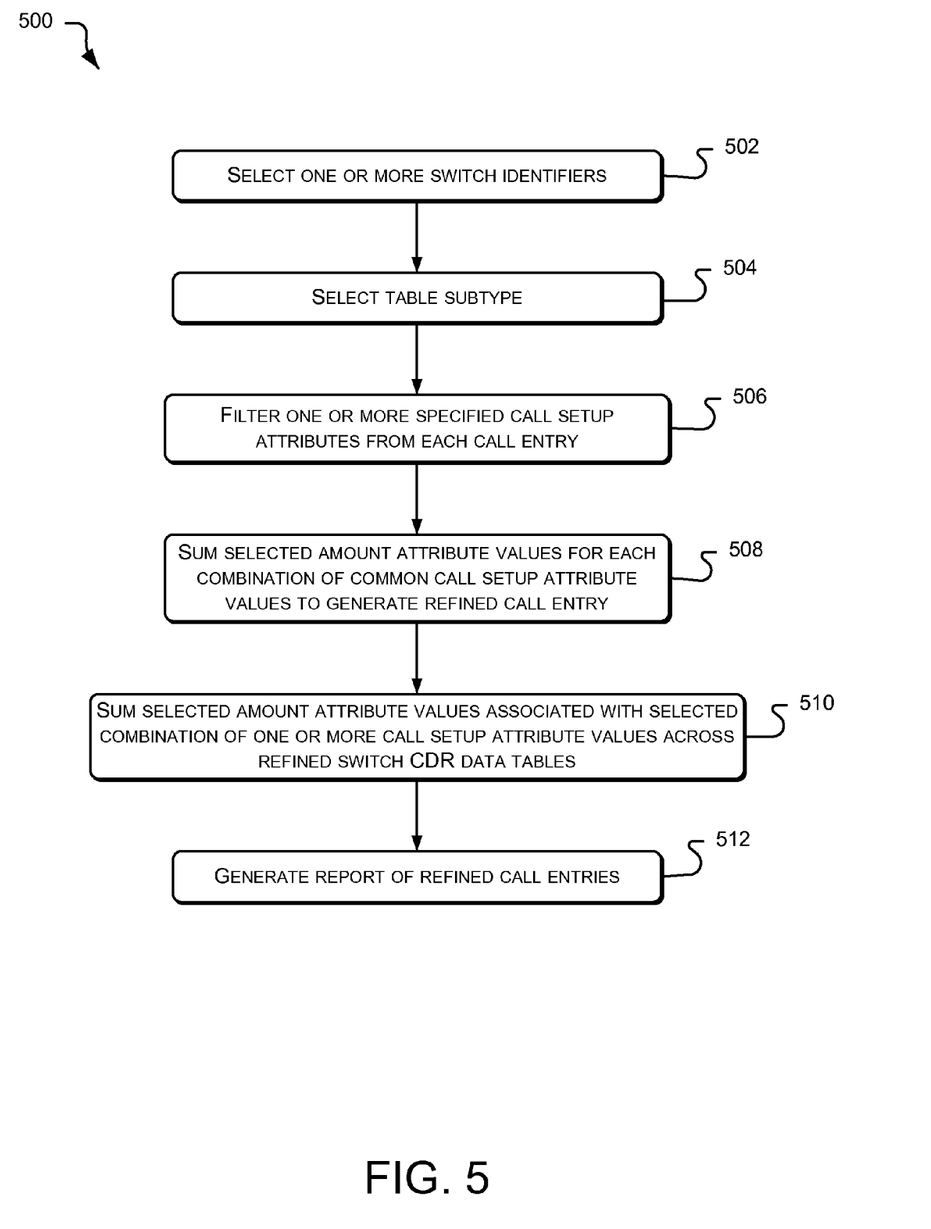
FIG. 5 is a flowchart illustrating a process for refining call detail data according to an embodiment.

FIG. 5 is a flowchart illustrating a call detail record (CDR) data refining process 500 according to an embodiment of the invention. The data refining process 500 may execute automatically or the data refining process 500 may be triggered in response to a command (e.g., user command) or a specified event. The data refining process 500 may be carried out by the electronic call detail data refinery system 204 of FIG. 2, or a similarly configured system. The process 500 uses CDR data that has been gathered from network elements and organized on an individual call basis (e.g., a CDR call entry for each individual call) in call entries of one or more tables, such as tables 302.

The refinement process 500 can be viewed as a two step CDR data reduction process. In the first reduction process, CDR amount attribute values (e.g., call duration, call completion count, total cost, penalty cost) are summed for groups of call entries having common values for a selected set of CDR call setup attributes (e.g., terminating NPA-NXX, state, partition, jurisdiction, terminating switch, costed/uncosted type) for each of one or more CDR data tables. In one embodiment, the first reduction process involve grouping unrefined CDR call entries that have common CDR call setup values for each network element. For each group of entries, the selected CDR amount attribute values are summed. The group of entries is then reduced into a single entry including the common CDR call setup attribute values and the summed CDR amount attribute values.

During the second reduction process, the refined call entries from the first reduction process are further reduced. The second reduction process involves summing CDR amount attribute values for groups of call entries across CDR data tables that have common values for the selected set of CDR call setup attributes. In one embodiment, the second reduction process involves grouping the reduced call entries from the first reduction process that have common values for the set of CDR call setup attributes and then summing each set of CDR amount attribute values for all the call entries in each group. The call entries for each group are reduced to a single call entry including the common CDR call setup attribute values and the summed CDR amount attribute values. The second CDR data reduction process may select a subset of the call setup attributes that were selected in the first reduction process, so that amount values are summed more grossly with regard to fewer call setup attributes.

The CDR data refinement process begins with a selecting operation 502. In selecting operation 502, one or more network element (NE) identifiers are selected from among the multiple NE identifiers corresponding to NEs of the network. The selecting operation 502 may read NE identifiers from CDR data tables 302 (FIG. 3) to choose one or more NEs. For example, the NE identifier "BOS" may be selected, which corresponds to a switch in Boston. Selecting operation 502 may select multiple terminating switches, such as, for example, Boston, Dallas and Chicago. In another selecting operation 504, one or more tables of designated subtype(s) are selected that include unrefined CDR data associated with the selected terminating switch. The selecting operation 504 may select one or more of a "costed" table (e.g., table 302a (FIG. 3)), an "uncosted" table (e.g., table 302b (FIG. 3)) associated with the selected terminating switch.

In a filtering operation 506, a subset of attribute values are read from each call entry in the selected table(s). The filtering operation 506 only reads a selected set of attribute values, such as terminating NPA-NXX, jurisdiction, partition, terminating vendor identifier (TVID), or other attribute values representing call setup criteria.

In the illustrated embodiment, a summing operation 508 represents the first reduction process. In summing operation 508, selected sets of amount attribute values (e.g., measurable attribute values) are summed in each table. The amount values are summed among call entries that have the same values for the selected call setup attributes. For example, if two entries have 201-203 as the terminating NPA-NXX, local as the jurisdiction, and enhanced partition, the minutes of use associated with those entries are summed and the entries are merged into a single entry (e.g., in another table such as 306a (FIG. 3)). As such, summing operation 508 results in a set of one or more first reduced CDR data tables.

In the illustrated embodiment, another summing operation 510 represents the second data reduction process. Summing operation 510 sums amount attribute values for a selected set of call setup attributes across all tables that resulted from the first reduction. In one embodiment, summing operation 510 sums minutes of use among all of the reduced call entries that have the same CDR call setup attribute values. For example, if multiple reduced call entries have the same terminating NPA-NXX, the same jurisdiction, the same partition, the same terminating switch ID, and the same TVID, the MOUs associated with those multiple call entries is summed, and the entries will be merged into a single entry (e.g., in another table such as refined call data table 404 (FIG. 4)).

In some embodiments, the set of call setup attributes over which amount attribute values are summed in the second summing operation 510 can be fewer than the number of call setup attributes over which amount attribute values are summed in the first summing operation 508. In this manner, the level of refinement of the data can be changed or set from the first reduction process to the second reduction process. For example, the first summing operation 508 may sum amount attribute values for each set of terminating NPA-NXX, terminating vendor ID, jurisdiction and state; and the second summing operation 508 may sum amount attribute values (from the first reduction) for each set of terminating NPA-NXX. In some embodiments, the call setup attributes that are used in each summing operation can be selected by the user.

A generating operation 512 generates a refined CDR call data report, which may be formatted in a number of ways, including user specified formatting. For example, a user interface (e.g., user interface 226 (FIG. 2)) can be used to enter call setup attributes over which the amount values are summed, select which amount values are presented, the layout of the report, or other settings.

In one embodiment, the process shown in FIG. 5 can be implemented in software with structured query language (SQL) statements. An example of a portion of software that can be used is shown below:

```
SELECT tnpa, tnxx, nn, juris, tswitch_id, SUM
(billable_mou), SUM (comp_calls), SUM (total_costs), SUM
(penalty_costs)
    FROM (SELECT  tnpa,  tnxx, CONCAT  (tnpa,  tnxx) AS nn,
juris, tswitch_id,
        SUM      (NVL      (billable_duration,    0)  /  60)  AS
    billable_mou,
        SUM (NVL (compl_call_attempts, 0)) AS comp_calls,
        SUM (NVL (total_cost, 0)) AS total_costs,
        SUM (NVL (penalty_cost, 0)) AS penalty_costs
    FROM acucdr.cdr_enhan_pen_sum_sat1_0804)
    GROUP BY tnpa, tnxx, nn, juris, tswitch_id
```

In the foregoing portion of software, terminating NPA-NXX, jurisdiction, and terminating switch ID attribute values are retrieved from CDR tables. Duration values (billable_duration) are converted into minutes of use by dividing by 60. Billable duration (i.e., MOUs) is then summed, completed call attempts are summed, the total costs are summed, and the penalty costs are summed. The foregoing section of software is repeated for all switches in the network. The summed data is stored in association with the corresponding NPA-NXX, terminating switch, and jurisdiction.

Although embodiments described herein concern call detail record (CDR) data and refinement of CDR data, it is to be understood that the concepts described are not limited to application to CDR data. The concepts described herein could be usefully applied to other types of data. For example, but without limitation, data refinement and report generation techniques described herein could be applied to Internet protocol (IP) networks, where routers could generate unrefined data descriptive of data packets routed through the routers. Data generated relating to routing of packets through an IP network could be refined using one or more of the concepts described herein.

Figure 6:
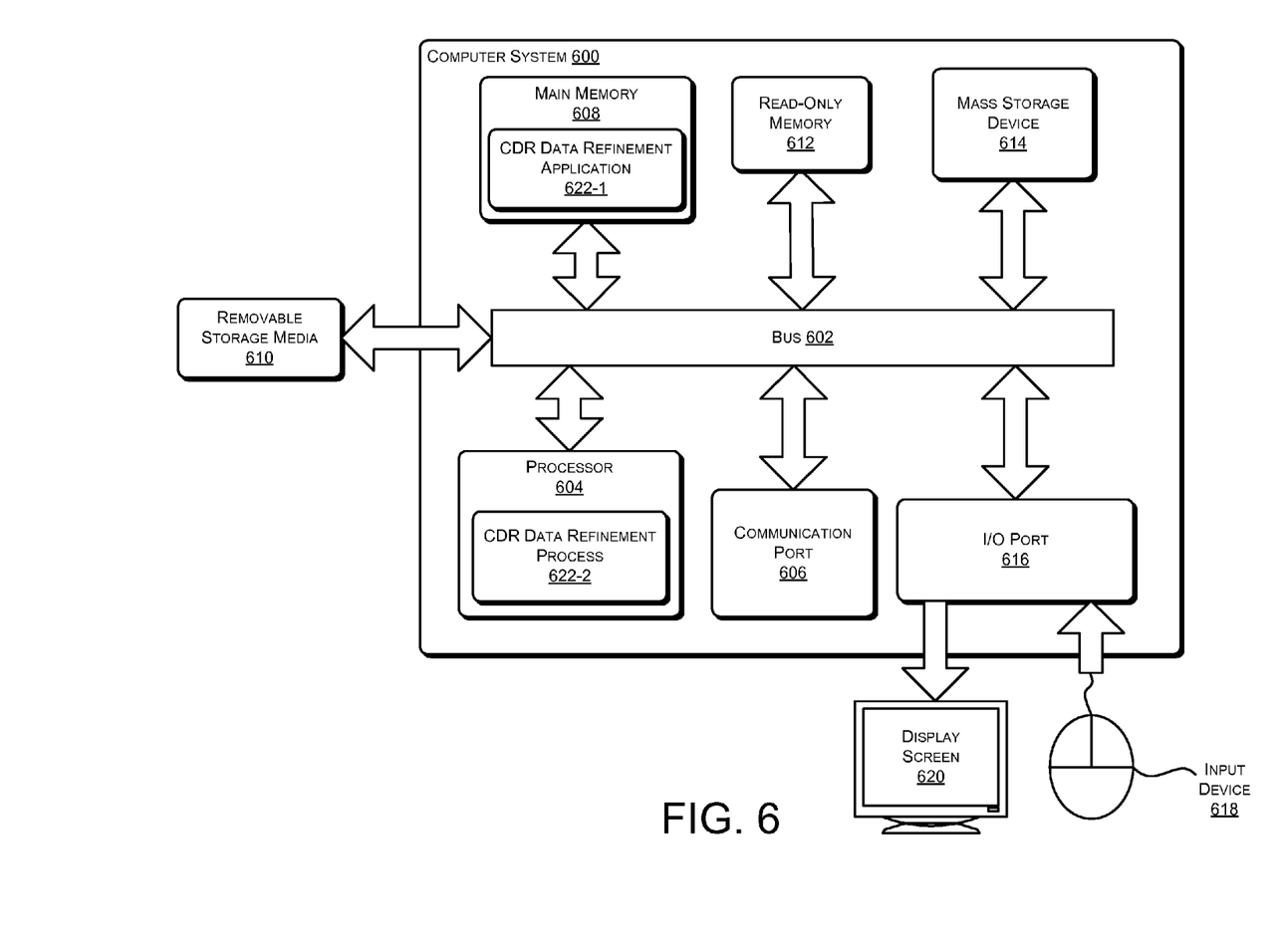
FIG. 6 is an example block diagram of a computer system configured with a CDR data refinement application and process according to embodiments herein.

FIG. 6 is a schematic diagram of a computer system 600 upon which embodiments of the present invention may be implemented and carried out. For example, one or more computing devices 600 may be used to filter a subset of call attributes for each call identified in an aggregation of call detail record (CDR) data, and sum costs and/or minutes of use for each terminating NPA-NXX in association with a selected subset of call attributes. Computer system 600 generally exemplifies any number of computing devices, including general purpose computers (e.g., desktop, laptop or server computers), or specific purpose computers (e.g., embedded systems).

According to the present example, the computer system 600 includes a bus 602 (i.e., interconnect), at least one processor 604, at least one communications port 606, a main memory 608, a removable storage media 610, a read-only memory 612, and a mass storage 614. Processor(s) 604 can be any known processor, such as, but not limited to, an Intel®, Itanium®, or Itanium 2® processor(s), AMD®, Opteron®, or Athlon MP® processor(s), or Motorola® lines of processors. Communications ports 606 can be any of an RS-232 port for use with a modem based dial-up connection, a 10/100 Ethernet port, a Gigabit port using copper or fiber, or a USB port. Communications port(s) 606 may be chosen depending on a network such as a Local Area Network (LAN), a Wide Area Network (WAN), or any network to which the computer system 600 connects. The computer system 600 may be in communication with peripheral devices (e.g., display screen 630, input device 618) via Input/Output (I/O) port 616.

Main memory 608 can be Random Access Memory (RAM), or any other dynamic storage device(s) commonly known in the art. Read-only memory 612 can be any static storage device(s) such as Programmable Read-Only Memory (PROM) chips for storing static information such as instructions for processor 604. Mass storage 614 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 602 communicatively couples processor(s) 604 with the other memory, storage, and communications blocks. Bus 602 can be a PCI/PCI-X, SCSI, or Universal Serial Bus (USB) based system bus (or other) depending on the storage devices used. Removable storage media 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 608 is encoded with CDR data refinement application 622-1 that supports functionality as discussed herein. For example, a CDR data refinement application 622-1 can include the data refinement module 220 and the refined call report generator 224 of FIG. 2. CDR data refinement application 622-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 604 accesses main memory 608 via the use of bus 602 in order to launch, run, execute, interpret, or otherwise perform the logic instructions of the CDR data refinement application 622-1. Execution of CDR data refinement application 622-1 produces processing functionality in CDR data refinement process 622-2. In other words, the CDR data refinement process 622-2 represents one or more portions of the CDR data refinement application 622-1 performing within or upon the processor(s) 604 in the computer system 600.

It should be noted that, in addition to the CDR data refinement process 622-2 that carries out operations as discussed herein, other embodiments herein include the CDR data refinement application 622-1 itself (i.e., the un-executed or non-performing logic instructions and/or data). The CDR data refinement application 622-1 may be stored on a computer readable medium (e.g., a repository) such as a floppy disk, hard disk, or in an optical medium. According to other embodiments, the CDR data refinement application 622-1 can also be stored in a memory type system such as in firmware, read only memory (ROM), or, as in this example, as executable code within the main memory 608 (e.g., within Random Access Memory or RAM). For example, CDR data refinement application 622-1 may also be stored in removable storage media 610, read-only memory 612, and/or mass storage device 614.

Example functionality supported by computer system 600 and, more particularly, functionality associated with CDR data refinement application 622-1 and CDR data refinement process 622-2 is discussed above with reference to FIGS. 1-5.

In addition to these embodiments, it should also be noted that other embodiments herein include the execution of the CDR data refinement application 622-1 in processor(s) 604 as the CDR data refinement process 622-2. Thus, those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware, or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer-implemented method for analyzing call routing in a network, the method comprising: capturing call detail record (CDR) data from one or more network elements;
storing the captured CDR data in CDR attribute tables, wherein each table includes call entries including CDR attribute values associated with a respective network element;
selecting a network element;
retrieving selected CDR attribute values from call entries in a CDR attribute table associated with the selected network element, wherein the selected CDR attribute values include one or more call setup attribute values and one or more amount attribute values in the call entries;
selecting a combination of one or more call setup attribute values retrieved from one or more call entries;
summing each of the one or more amount attribute values from one or more call entries having the selected combination of one or more call setup attribute values; and
generating a refined call entry including the selected combination of call setup attribute values and each of the one or more summed amount attribute values.

2. The computer-implemented method of claim 1, wherein the selected CDR call setup attribute values include terminating switch identifier, switch partition code, jurisdiction, terminating area code, terminating local exchange code, state, and terminating vendor identifier.

3. The computer-implemented method of claim 1, wherein the selected CDR amount attribute values include minutes of use, call completion count, penalty cost, and total cost.

4. The computer-implemented method of claim 1, further comprising:
selecting a plurality of other network elements;
for each selected network element among the plurality of other network elements:
retrieving one or more call setup attribute values and one or more amount attribute values from call entries in a CDR attribute table associated with the selected network element;
selecting the combination of one or more call setup attribute values retrieved from one or more call entries;
summing each of the one or more amount attribute values from one or more call entries having the selected combination of one or more call setup attribute values; and
generating a refined call entry for the selected network element, the refined call entry including the selected combination of call setup attribute values and each of the one or more summed amount attribute values;
after generating refined call entries for the plurality of other network elements, summing each of the one or more amount attribute values from the generated refined call entries having the combination of one or more call setup attribute values; and
generating another refined call entry for all the network elements, the other refined call entry including the selected combination of call setup attribute values and each of the one or more summed amount attribute values.

5. The computer-implemented method of claim 4, further comprising generating a report including a plurality of refined call entries having summed amount attribute values presented in association with the selected combination of call setup attribute values.

6. The computer-implemented method of claim 1, wherein selecting the CDR attribute values comprises filtering a plurality of CDR attribute values from each call entry.

7. A computer program product comprising non-transitory computer-readable media storing computer-executable instructions, which when executed cause a computer to perform a process, the process comprising:
capturing call detail record (CDR) data from one or more network elements;
refining the CDR data by performing:
a first CDR data reduction process including, for each of the network elements, aggregating selected CDR amount attribute values associated with a selected combination of CDR call setup attributes, wherein the first CDR data reduction process generates a plurality of first refined CDR data entries including a plurality of CDR call setup attribute values and the associated aggregated CDR amount attribute values; and a second CDR data reduction process including summing the selected CDR amount attribute values from the plurality of first refined CDR data entries having the same set of CDR call setup values, wherein the second CDR data reduction process generates a plurality of second refined CDR data entries.

8. The computer program product of claim 7, wherein the selected combination of CDR call setup attributes comprises terminating switch identifier, switch partition code, jurisdiction, terminating area code, terminating local exchange code, state, and terminating vendor identifier.

9. The computer program product of claim 7, wherein the selected CDR amount attribute values comprise minutes of use, call completion count, penalty cost, and total cost.

10. The computer program product of claim 7, wherein the process further comprises generating a report including the plurality of second refined CDR data entries.

11. The computer program product of claim 7, wherein the first reduction process further includes grouping CDR data entries in the captured CDR data according to combinations of CDR call setup attribute values.

12. The computer program product of claim 11, wherein summing the CDR amount attribute values comprises summing corresponding CDR amount attribute values in each group.

13. The computer program product of claim 7, wherein the first reduction process further includes converting duration values from the network elements into minutes of use (MOU) values.

14. A system comprising:
an electronic call detail record (CDR) data capture system configured to receive CDR data from one or more network elements in a network; and
an electronic CDR data refinement system configured to:
retrieve unrefined CDR data from the electronic CDR data capture system and refine the data by grouping CDR call entries according to selected CDR call setup attributes into groups having common CDR call setup attribute values and summing CDR amount attribute values in each group;
for each group, creating a single refined CDR call entry, wherein the CDR call entry includes the CDR call setup attributes common to the group and the summed CDR amount attribute values.

15. The system of claim 14, wherein the electronic CDR data refinement system groups unrefined CDR call entries by selecting CDR call setup attribute values that are common among one or more unrefined CDR call entries.

16. The system of claim 14, wherein the electronic CDR data refinement system further comprises a refined CDR data report generator configured to generate a report of refined CDR call entries that include summed CDR amount attribute values for each group of CDR call setup attribute values for all of the one or more network elements.

17. The system of claim 14, wherein the electronic CDR data refinement system further comprises a user interface enabling a user to select the CDR call setup attributes and the CDR amount attributes.

18. The system of claim 14, wherein:
the electronic CDR data capture system is configured to store the received CDR data respective call entries in a plurality of tables, each call entry identifying a call terminated by a NE, and each of the plurality of tables storing call entries corresponding to calls terminated by a specified NE; and
wherein the electronic CDR data refinement system is further configured to first group selected call entries within each of a selected one or more of the plurality of tables and sum CDR amount values in each of the first groups to generate a first reduced set of tables, and the electronic CDR data refinement system is further configured to second group selected call entries across all of the first reduced set of tables and sum CDR amount values in each of the second groups to generate a final refined CDR data report.

* * * * *